(12) United States Patent
Gupta et al.

(10) Patent No.: US 12,330,916 B2
(45) Date of Patent: Jun. 17, 2025

(54) WATER DETECTION IN ELEVATOR PIT USING PIT SENSORS

(71) Applicant: Otis Elevator Company, Farmington, CT (US)

(72) Inventors: Ankit Anand Gupta, Uttar Pradesh (IN); Stella M. Oggianu, Farmington, CT (US); Dinesh Selvaraj, Bengaluru (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1672 days.

(21) Appl. No.: 16/575,765

(22) Filed: Sep. 19, 2019

(65) Prior Publication Data

US 2020/0095092 A1 Mar. 26, 2020

(30) Foreign Application Priority Data

Sep. 21, 2018 (IN) .............................. 201811035568

(51) Int. Cl.
*B66B 5/02* (2006.01)
*B66B 1/28* (2006.01)
*B66B 1/34* (2006.01)
*B66B 5/00* (2006.01)
*G01F 23/24* (2006.01)
*G01F 23/64* (2006.01)

(52) U.S. Cl.
CPC .............. *B66B 5/021* (2013.01); *B66B 1/28* (2013.01); *B66B 1/3461* (2013.01); *B66B 5/0031* (2013.01); *G01F 23/241* (2013.01); *G01F 23/64* (2013.01)

(58) Field of Classification Search
CPC ....... B66B 1/3407–3423; B66B 1/3446–3461; B66B 1/46; B66B 1/50; B66B 5/00; B66B 5/0006; B66B 5/0018; B66B 5/0031; B66B 5/02–025
See application file for complete search history.

(56) References Cited

U.S. PATENT DOCUMENTS

| 5,655,561 | A | 8/1997 | Wendel et al. |
| 6,321,876 | B1* | 11/2001 | Kawai .................... B66B 5/022 |
| | | | 187/391 |
| 6,523,562 | B2 | 2/2003 | Harper |
| 7,768,412 | B2 | 8/2010 | Vokey |

(Continued)

FOREIGN PATENT DOCUMENTS

| CN | 102285566 A | 12/2011 |
| CN | 102372207 B | 3/2012 |

(Continued)

OTHER PUBLICATIONS

Chinese Office Action for Application No. 201910891766.6; Issued Sep. 10, 2020; 10 Pages.

(Continued)

*Primary Examiner* — Christopher Uhlir
(74) *Attorney, Agent, or Firm* — CANTOR COLBURN LLP (57) ABSTRACT

A method of detecting water within a pit of an elevator shaft including: detecting water within a pit of an elevator shaft using a water sensor; wirelessly transmitting a notification to a controller; and transmitting the notification to a computing device.

19 Claims, 4 Drawing Sheets

(56) References Cited

U.S. PATENT DOCUMENTS

| | | | |
|---|---|---|---|
| 7,956,760 | B2 | 6/2011 | Hill |
| 8,051,955 | B2 | 11/2011 | Therriault |
| 2015/0375962 | A1* | 12/2015 | Hamlett ................ B66B 5/022 |
| | | | 187/247 |
| 2020/0071125 | A1* | 3/2020 | Kuhn ................ B66B 1/3461 |

FOREIGN PATENT DOCUMENTS

| | | |
|---|---|---|
| CN | 204675540 U | 9/2015 |
| CN | 104961016 A | 10/2015 |
| CN | 205772591 U | 12/2016 |
| CN | 106365007 B | 2/2017 |
| CN | 106672729 A | 5/2017 |
| CN | 207209654 U | 4/2018 |
| CN | 207375537 A | 5/2018 |
| CN | 207581153 U | 7/2018 |
| CN | 207593272 U | 7/2018 |
| CN | 207608158 U | 7/2018 |
| CN | 108358009 A | 8/2018 |
| JP | H06158394 A | 6/1994 |
| JP | H06329289 A | 11/1994 |
| JP | H0912249 A | 1/1997 |
| JP | 2001206658 A | 7/2001 |
| JP | 2002338161 A | 11/2002 |
| JP | 2004067295 A | 3/2004 |
| JP | 2005272036 A | 10/2005 |
| JP | 2007084167 A | 4/2007 |
| JP | 2007179411 A | 7/2007 |
| JP | 2010265053 A | 11/2010 |
| JP | 4598538 B2 | 12/2010 |
| JP | 2011195249 A | 10/2011 |
| JP | 2011195284 A | 10/2011 |
| JP | 2012056708 A | 3/2012 |
| JP | 5645439 B2 | 12/2014 |
| JP | 5710457 B2 | 4/2015 |
| JP | 2015137156 A | 7/2015 |
| JP | 2015227235 A | 12/2015 |
| JP | 5923803 B1 | 5/2016 |
| KR | 101215862 A | 12/2012 |
| KR | 1020130126021 A | 11/2013 |
| WO | 2010056260 A1 | 5/2010 |
| WO | 2017115145 A1 | 7/2017 |

OTHER PUBLICATIONS

European Search Report for Application No. 19199041.5; Issued Feb. 18, 2022; 5 Pages.

European Search Report for Application No. 19199041.5; Issued Mar. 26, 2020; 7 Pages.

Gingiber, Jay; "Sensor Application Technology", Oxford Publishers, pp. 91-92, Feb. 28, 2010.

Jinkuan et al, "New Series of Textbooks on Automation in Colleges and Universities: Introduction to Automation" Beijing University of Posts and Telecommunications Press, Feb. 1, 2006, 7 pages. (with English Abstract).

Weipei et al., "Design, Construction, Operation and Maintenance of Automatic Water Regine Monitoring and Reporting System", Yellow River Water Conservancy Press, Dec. 1, 2012. 6 Pages.

\* cited by examiner

WATER DETECTION IN ELEVATOR PIT USING PIT SENSORS

CROSS-REFERENCE TO RELATED APPLICATIONS

This application claims the benefit of Provisional Indian Application No. 201811035568 filed Sep. 21, 2018, which is incorporated herein by reference in its entirety.

BACKGROUND

The subject matter disclosed herein relates generally to the field of elevator systems, and specifically to a method and apparatus for detecting water within a pit of an elevator shaft.

Occasionally, water may migrate into an elevator shaft and collect in a pit (i.e., bottom portion) of the elevator shaft. The collection of water within a pit of an elevator shaft may not be an immediate concern but over time extended periods of water collection and/or specific amounts of water may require the water to be removed. Conventionally, water collecting within the pit of the elevator shaft is discovered by an elevator technician typically inspecting the elevator system for other reasons unrelated to the collection of water.

BRIEF SUMMARY

According to an embodiment, a method of detecting water within a pit of an elevator shaft is provided. The method including: detecting water within a pit of an elevator shaft using a water sensor; wirelessly transmitting a notification to a controller; and transmitting the notification to a computing device.

In addition to one or more of the features described herein, or as an alternative, further embodiments may include: adjusting operation of an elevator system associated with the elevator shaft in response to detecting water.

In addition to one or more of the features described herein, or as an alternative, further embodiments may include that adjusting operation of an elevator system further includes: stopping operation of the elevator system.

In addition to one or more of the features described herein, or as an alternative, further embodiments may include that adjusting operation of an elevator system further includes: adjusting service landings of the elevator system.

In addition to one or more of the features described herein, or as an alternative, further embodiments may include: determining a height of a water level of the water within the elevator shaft.

In addition to one or more of the features described herein, or as an alternative, further embodiments may include that the notification is transmitted to the controller at a selected frequency.

In addition to one or more of the features described herein, or as an alternative, further embodiments may include: determining a selected frequency in response to the height of the water level of the water within the elevator shaft, wherein the notification is transmitted to the controller at the selected frequency.

In addition to one or more of the features described herein, or as an alternative, further embodiments may include that detecting water within a pit of an elevator shaft using a water sensor further includes: detecting completion of a circuit between a first electrode and a second electrode by water.

In addition to one or more of the features described herein, or as an alternative, further embodiments may include that detecting water within a pit of an elevator shaft using a water sensor further includes: detecting when a buoy moves from a first buoy height to a second buoy height.

In addition to one or more of the features described herein, or as an alternative, further embodiments may include: activating an alarm on the computing device in response to the notification.

According to another embodiment, a water sensor for detecting water within a pit of an elevator shaft is provided. The method including: a power source configured to power the water sensor; a controller configured to control operation of the water sensor; a sensing device configured to detect water; and a communication device configured to wirelessly transmit a notification to a controller of an elevator system associated with the elevator shaft when water is detected by the sensing device.

In addition to one or more of the features described herein, or as an alternative, further embodiments may include that the notification includes an operation adjustment of the elevator system associated with the elevator shaft in response to the detection of water.

In addition to one or more of the features described herein, or as an alternative, further embodiments may include that the operation adjustment includes a command to stop operation of the elevator system.

In addition to one or more of the features described herein, or as an alternative, further embodiments may include that the operation adjustment includes a command to adjust service landings of the elevator system.

In addition to one or more of the features described herein, or as an alternative, further embodiments may include that the sensing device is configured to determine a height of a water level of the water within the elevator shaft.

In addition to one or more of the features described herein, or as an alternative, further embodiments may include that the notification is transmitted to the controller at a selected frequency.

In addition to one or more of the features described herein, or as an alternative, further embodiments may include that a selected frequency to transmit the notification is determined in response to the height of the water level of the water within the elevator shaft, wherein the notification is transmitted to the controller at the selected frequency.

In addition to one or more of the features described herein, or as an alternative, further embodiments may include that the water sensor further includes: a first electrode at a first height away from a bottom of the elevator shaft; a second electrode at the first height away from the bottom of the elevator shaft and at a first horizontal distance away from the first electrode, wherein the water sensor is configured to detect water within the elevator shaft when a circuit between the first electrode and the second electrode is completed by water.

In addition to one or more of the features described herein, or as an alternative, further embodiments may include that the water sensor further includes: a buoy, wherein the water sensor is configured to detect water within the elevator shaft when the buoy moves from a first buoy height to a second buoy height.

Technical effects of embodiments of the present disclosure include detecting water within a pit of an elevator system utilizing wireless pit sensors.

The foregoing features and elements may be combined in various combinations without exclusivity, unless expressly indicated otherwise. These features and elements as well as the operation thereof will become more apparent in electromagnetic wave source of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
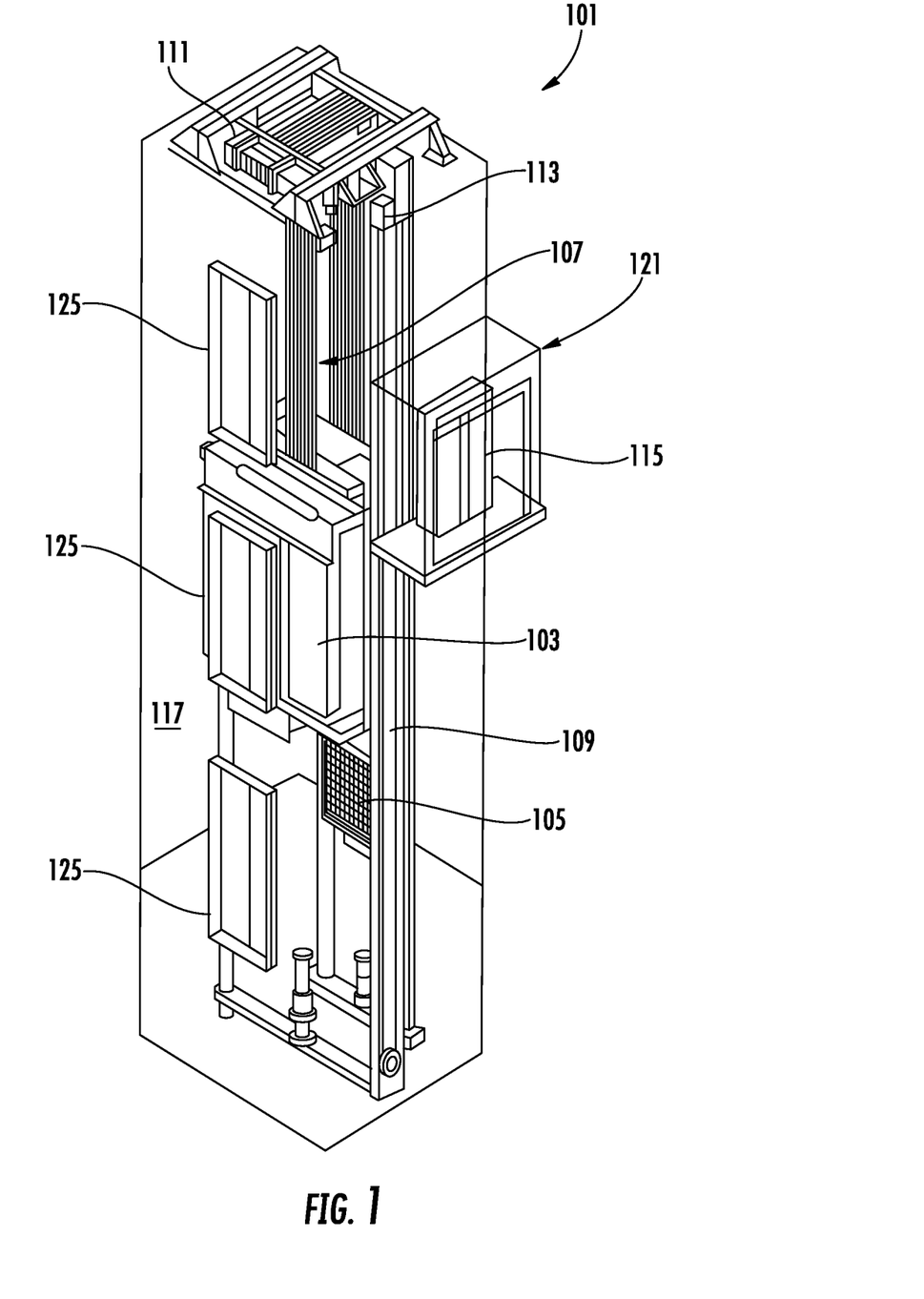
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
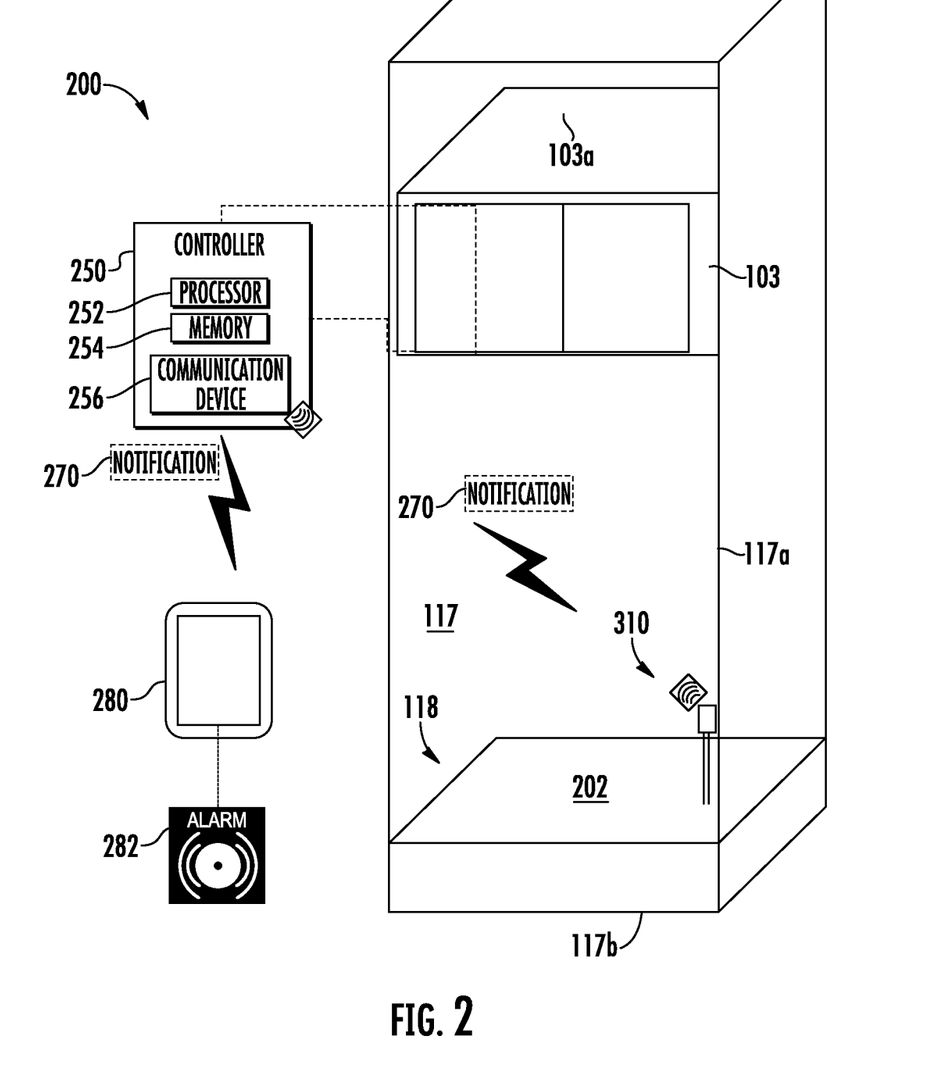
FIG. 2 illustrates a schematic view of a water detection system for the elevator system of FIG. 1, in accordance with an embodiment of the disclosure.

Referring now to FIG. 2 with continued reference to FIG. 1, a water detection system 200 for the elevator system 100 of FIG. 1 is illustrated, according to an embodiment of the present disclosure. Occasionally, water 202 may migrate into an elevator shaft 117 and collect in a pit 118 (i.e., bottom portion) of the elevator shaft 117. The collection of water 202 within a pit 118 of an elevator shaft 117 may not be an immediate concern but over time extended periods of water 202 collection and/or specific amounts of water 202 may require the water 202 to be removed. Conventionally, water 202 collecting within the pit 118 of the elevator shaft 117 is discovered by an elevator technician typically inspecting the elevator system 100 for other reasons unrelated to the collection of water 202.

As shown in FIG. 2, the water detection system 200 comprises a water sensor 310 and a controller 250. The controller 250 may perform other tasks in addition to the detection of water 202 within the pit. It should be appreciated that, although particular systems are separately defined in the schematic block diagrams, each or any of the systems may be otherwise combined or separated via hardware and/or software. The water sensor 310 may be mounted proximate the bottom 117b of the elevator shaft 117 within the pit 118 of the elevator shaft 117. The number of sensors 310 may vary. In the case of a multi-elevator system, a single sensor 310 may serve multiple shafts. The water sensor 310 may be mounted to a side 117a of the elevator shaft 117 or the bottom 117b of the elevator shaft 117b.

The controller 250 is in electronic communication with the water sensor 310. The electronic communication between the water sensor 310 and the controller 250 is wireless. In an embodiment, the controller 250 may be the controller 115 of the elevator system 100. In another embodiment, the controller 250 may be the specific controller of the elevator car 103. The controller 250 may be mounted on the elevator car 103. In an embodiment, the controller 250 is mounted on the top 103a of the elevator car 103.

The controller 250 may be an electronic controller including a processor 252 and an associated memory 254 comprising computer-executable instructions that, when executed by the processor 252, cause the processor 252 to perform various operations. The processor 252 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be but is not limited to a random access memory (RAM), read only memory (ROM), or other electronic, optical, magnetic or any other computer readable medium. In another embodiment, the controller 250 may be any other controller located locally or in the cloud.

The controller 250 includes a communication device 256 to communicate with the water sensor 310 and a computing device 280. The communication device 256 may utilize radio signals for communication such as, for example, Wi-Fi, Bluetooth, ZigBee, etc. The water sensor 310 is configured to detect water 202 within the pit 118 and transmit a notification to the controller 250.

The controller 250 may then transmit the notification 270 to a computing device 280 indicating whether water 202 is detected within the pit 118 of the elevator shaft 117. The notification 270 may be in the form of a text message, email, application alert, alarm, etc. The notification 270 may be transmitted to a cloud computing network from the transmission to the computing device 280. The transmission between the controller 250 and the computing device 270 may be wired and/or wireless. Communication between the controller 250 and computing device 280 may be bidirectional communication. The computing device 280 can be used to reset the set notification, update firmware and requesting event logs, etc. The computing device 280 a computing device such as a desktop computer. The computing device 280 may also be a mobile computing device that is typically carried by a person, such as, for example a phone, PDA, smart watch, tablet, laptop, etc. The computing device 280 may also be two separate devices that are synced together such as, for example, a cellular phone and a desktop computer synced over an internet connection. The computing device 280 may be configured to activate an alarm 282 in response to the notification 270. The alarm 282 may be audible, vibratory, and/or visual. The alarm 282 may alert a user of the computing device 282 as to whether water 202 is present in the pit 118.

Figure 3:
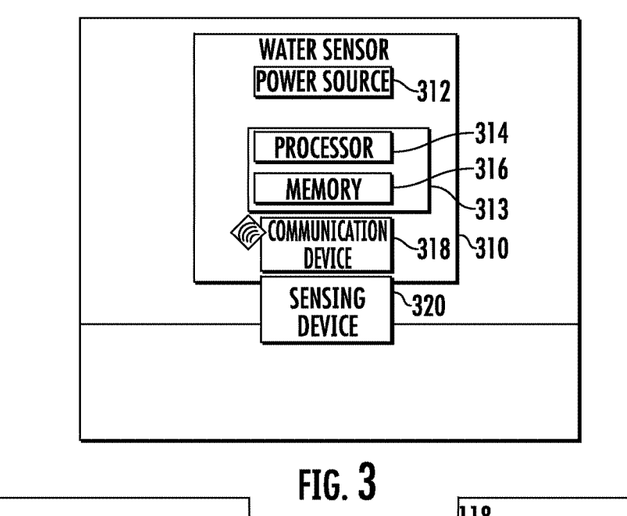
FIG. 3 illustrates a schematic view of a water sensor for the water detection system of FIG. 2, in accordance with an embodiment of the disclosure.
Figure 4A:
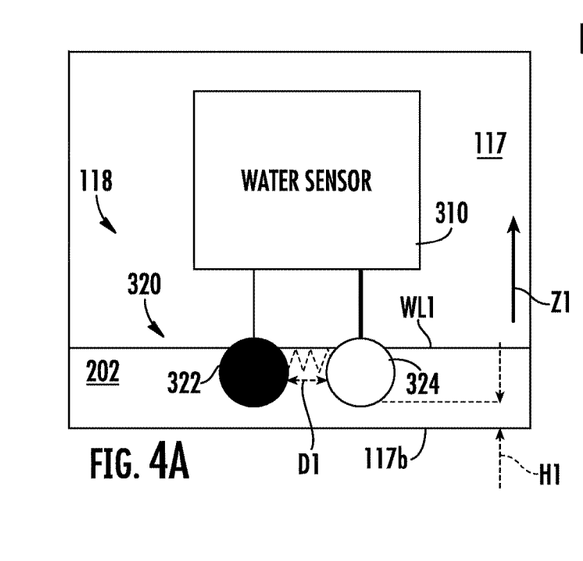
FIG. 4A illustrates a schematic view of a water sensing device for the water sensor of FIG. 3, in accordance with an embodiment of the disclosure.
Figure 4B:
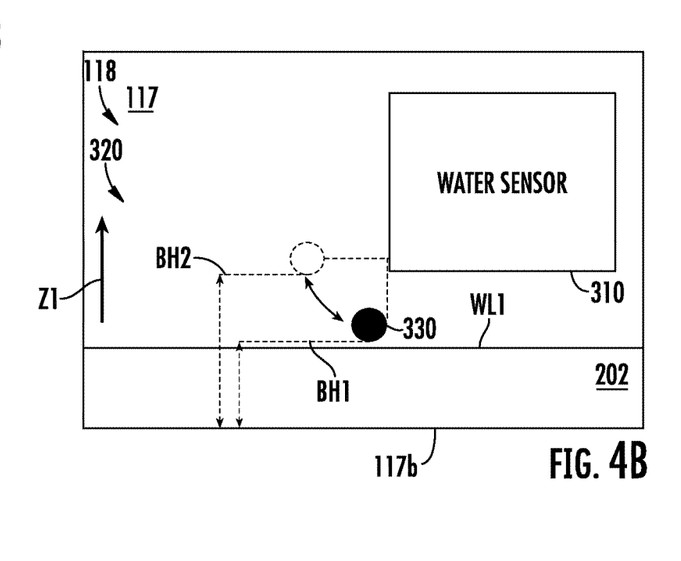
FIG. 4B illustrates a schematic view of a water sensing device for the water sensor of FIG. 3, in accordance with an embodiment of the disclosure.

Referring now to FIGS. 3, 4a, and 4b with continued reference to FIGS. 1-2, a water sensor system 310 for the elevator system 100 of FIG. 1 is illustrated, according to an embodiment of the present disclosure. As shown in FIG. 3, the water sensor 310 includes a power source 312, a controller 313, a communication device 318, and a sensing device 320.

The power source 312 is configured to provide power to the water sensor 310. The power source 312 may be an energy harvesting device and/or a battery. The battery may be a lithium ion battery or any other energy storage device known to one of skill in the art. The communication device 318 may be a radio transponder that utilizes radio signals for communication with the communication device 256 of the controller 250. The communication device 318 may utilize radio signals, such as, for example, Wi-Fi, Bluetooth, ZigBee, zWave, etc. In an embodiment, the sensor 310 may utilize the communication device 318 to communicate directly with a controller 250 located on a cloud computing network, thus the communication device 318 may communicate directly with the cloud computing network.

The controller 313 is configured to control operation of the water sensor 310, such as, for example process and communicate water sensor information. In an embodiment, the controller 313 may be a microcontroller unit (MCU). The controller 313 may be an electronic controller including a processor 314 and an associated memory 316 comprising computer-executable instructions that, when executed by the processor 314, cause the processor 314 to perform various operations. The processor 314 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 316 may be but is not limited to a random access memory (RAM), read only memory (ROM), or other electronic, optical, magnetic or any other computer readable medium.

The water sensor 310 includes a sensing device 320 configured detect water 202. The sensing device 320 may include a variety of different sensing mechanisms. FIG. 4a illustrates a first embodiment of a sensing device 320 that may be utilized in the water sensor 310 and FIG. 4b illustrates a second embodiment of a sensing device 320 that may be in the water sensor 310. It is understood that while two sensing devices 320 are illustrated in FIGS. 4a and 4b, embodiments of the sensing system 200 disclosed herein are not limited to these two embodiments of sensing devices 320 shown in FIGS. 4a and 4b. It is understood that while two sensing devices 320 are illustrated in FIGS. 4a and 4b, embodiments of the sensing system 200 disclosed herein are not limited to these two embodiments of sensing devices 320 shown in FIGS. 4a and 4b and may include a combination of these two these two embodiments of sensing devices 320 shown in FIGS. 4a and 4b.

The sensing device 320 illustrated in FIG. 4a includes a first electrode 322 and a second electrode 324. The first electrode 322 and the second electrode 324 may be placed at a height H1 within the elevator shaft 117. The height H1 may be measured from the bottom 117b of the elevator shaft 117. The first electrode 322 and the second electrode 324 may be horizontally separated by a first horizontal distance D1 within the elevator shaft 117. As water 202 fills the pit 118 of the hoistway 117, the water level WL1 rises upward Z1. When the water 202 reaches the first electrode 322 and the second electrode 324 a circuit is completed between the first electrode 322 and the second electrode 324 and then the water sensor 310 can transmit a notification 270 to the controller 250 indicating that water 202 has been detected within the pit 118. The height of the water level WL1 may also be determined since the height H1 is known. The sensing device 320 may include multiple sets of first electrodes 322 and second electrodes 324 at various heights to track the change in a height of the water level WL1.

The sensing device 320 illustrated in FIG. 4b includes a buoy 330 that is buoyant in water 202. Since the buoy 330 floats in water 202, the first buoy height BH1 of the buoy 330 will raise and fall with the water level WL1 within the pit 118. The first buoy height BH1 of the buoy 330 may be measured from the bottom 117b of the elevator shaft 117. As water 202 fills the pit 118 of the hoistway 117, the water level WL1 rises upward Z1. The rising water level WL1 moves the buoy 330 upward Z1. When the height of the buoy 330 reaches as second buoy height BH2 then the water sensor 310 can transmit a notification 270 to the controller 250 indicating that water 202 has been detected within the pit 118. The sensing device 320 may include multiple buoys at various heights to track the change in a height of the water level WL1. It is understood that while two embodiments of sensing devices 320 are illustrated in FIGS. 4a and 4b any water sensing device (e.g., float switch) may be utilized with embodiments disclosed herein.

Figure 5:
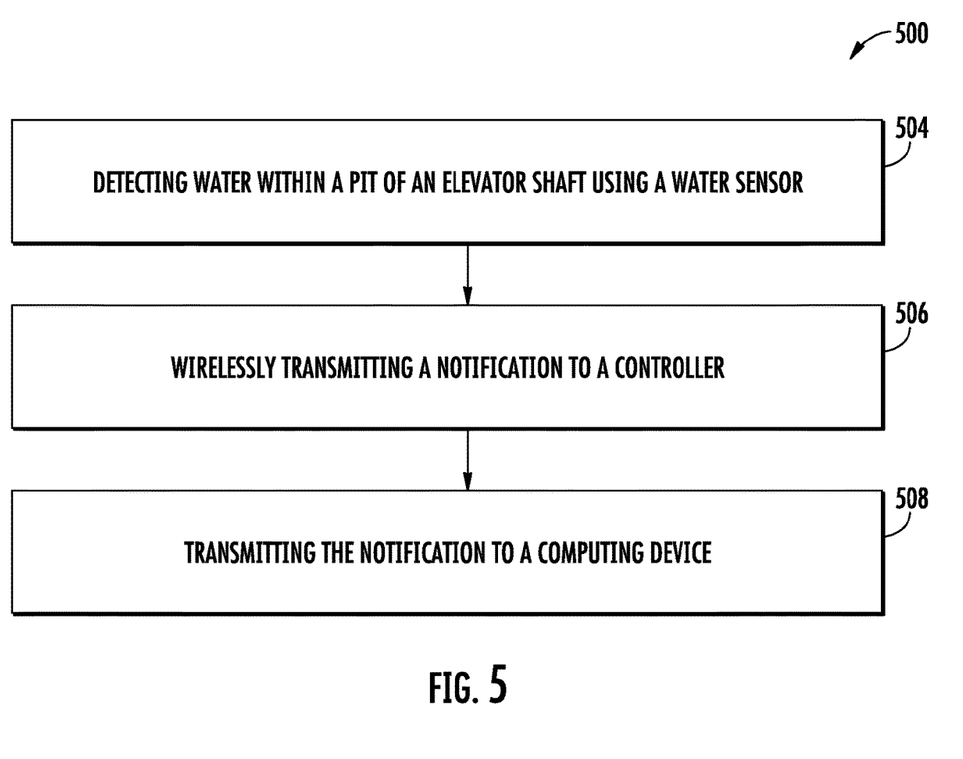
FIG. 5 is a flow chart of method of detecting water within a pit of a shaft of the elevator system of FIG. 1, in accordance with an embodiment of the disclosure.

Referring now to FIG. 5, while referencing components of FIGS. 1-4a and 4b. FIG. 5 shows a flow chart of method 500 of detecting water 202 within a pit 118 of an elevator shaft 117. In an embodiment, the method 500 may be performed by the water detection system 200. At block 504, water 202 is detected within a pit 118 of an elevator shaft 117 using a water sensor 310. At block 506, a notification 270 is wirelessly transmitted to a controller 250 from the water sensor 310. At block 508, the notification 270 is transmitted from the controller 250 to a computing device 280. The notification 270 may be transmitted to the controller 250 at a selected frequency. The selected frequency may be determined in response to a height of the water level WL1 in the elevator shaft.

When water 202 is not detected, then water sensor 310 may send a periodic heartbeat signal to the controller 250. This period heartbeat signal may be to confirm that the water sensor 310 is alive and ready. The periodic heartbeat signal can contain fields like water detection status, battery voltage, etc. The frequency of the heartbeat signal is configurable and can be as low as once/twice day The method 500 may further comprise: adjusting operation of an elevator system 100 associated with the elevator shaft 117 in response to detecting water 202. In an embodiment, the notification 270 may include an operation adjustment, which instructs the controller 250 to adjust operation of the elevator system 100. For example, the operation adjustment may include a command instructing the controller 250 to stop operation of the elevator system 100 or adjust service landings 125 of the elevator system 100. For example, the elevator system may be instructed to no longer service a landing 125 located in the basement if the water level WL1 is at or near the basement. The method 500 may further comprise: determining a height of a water level of the water WL1 within the elevator shaft 117. The method 500 may also comprise: activating an alarm 282 on the computing device 282 in response to the notification 270. The alarm 282 may be resent automatically (e.g., through detection by the electromagnetic wave detector 210) or manually (e.g., by a building manager or mechanic).

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of detecting water within a pit of an elevator shaft, the method comprising:
   detecting water within a pit of an elevator shaft using a water sensor;
   wirelessly transmitting a notification to a controller;
   transmitting the notification to a computing device;
   wherein the water sensor is configured to send a periodic heartbeat signal to the controller in response to water not being detected within the pit; and
   wherein the periodic heartbeat signal comprises water detection status and battery voltage.

2. The method of claim 1, further comprising:
   adjusting operation of an elevator system associated with the elevator shaft in response to detecting water.

3. The method of claim 2, wherein adjusting operation of an elevator system further comprises:
   stopping operation of the elevator system.

4. The method of claim 2, wherein adjusting operation of an elevator system further comprises:
   adjusting service landings of the elevator system.

5. The method of claim 1, further comprising:
determining a height of a water level of the water within the elevator shaft.

6. The method of claim 1, wherein the notification is transmitted to the controller at a selected frequency.

7. The method of claim 5, further comprising:
determining a selected frequency in response to the height of the water level of the water within the elevator shaft, wherein the notification is transmitted to the controller at the selected frequency.

8. The method of claim 1, wherein detecting water within a pit of an elevator shaft using a water sensor further comprises:
detecting completion of a circuit between a first electrode and a second electrode by water.

9. The method of claim 1, wherein detecting water within a pit of an elevator shaft using a water sensor further comprises:
detecting when a buoy moves from a first buoy height to a second buoy height.

10. The method of claim 1, further comprising:
activating an alarm on the computing device in response to the notification.

11. A water sensor for detecting water within a pit of an elevator shaft, the water sensor comprising:
a power source configured to power the water sensor;
a controller configured to control operation of the water sensor
a sensing device configured to detect water; and
a communication device configured to wirelessly transmit a notification to a controller of an elevator system associated with the elevator shaft in response to water being detected by the sensing device and to send a periodic heartbeat signal to the controller in response to water not being detected and wherein the periodic heartbeat signal comprises water detection status and battery voltage.

12. The water sensor of claim 11, wherein the notification includes an operation adjustment of the elevator system associated with the elevator shaft in response to the detection of water.

13. The water sensor of claim 12, wherein the operation adjustment includes a command to stop operation of the elevator system.

14. The water sensor of claim 12, wherein the operation adjustment includes a command to adjust service landings of the elevator system.

15. The water sensor of claim 11, wherein the sensing device is configured to determine a height of a water level of the water within the elevator shaft.

16. The water sensor of claim 11, wherein the notification is transmitted to the controller at a selected frequency.

17. The water sensor of claim 15, wherein a selected frequency to transmit the notification is determined in response to the height of the water level of the water within the elevator shaft, wherein the notification is transmitted to the controller at the selected frequency.

18. The water sensor of claim 11, wherein the water sensor further comprises:
a first electrode at a first height away from a bottom of the elevator shaft;
a second electrode at the first height away from the bottom of the elevator shaft and at a first horizontal distance away from the first electrode, wherein the water sensor is configured to detect water within the elevator shaft when a circuit between the first electrode and the second electrode is completed by water.

19. The water sensor of claim 11, wherein the water sensor further comprises:
a buoy, wherein the water sensor is configured to detect water within the elevator shaft when the buoy moves from a first buoy height to a second buoy height.

* * * * *